(12) United States Patent
Stefani

(10) Patent No.: US 8,157,627 B2
(45) Date of Patent: Apr. 17, 2012

(54) AIR CONDITIONING SYSTEM FOR THE PASSENGER COMPARTMENT OF A VEHICLE

(75) Inventor: Giovanni Stefani, Sassuolo (IT)

(73) Assignee: Ferrari S.p.A., Modena (IT)

( * ) Notice: Subject to any disclaimer, the term of this patent is extended or adjusted under 35 U.S.C. 154(b) by 586 days.

(21) Appl. No.: 12/226,192

(22) PCT Filed: Apr. 13, 2007

(86) PCT No.: PCT/IB2007/000969
§ 371 (c)(1),
(2), (4) Date: May 26, 2009

(87) PCT Pub. No.: WO2007/119152
PCT Pub. Date: Oct. 25, 2007

(65) Prior Publication Data
US 2009/0298411 A1    Dec. 3, 2009

(30) Foreign Application Priority Data
Apr. 13, 2006    (IT) .............................. BO2006A0281

(51) Int. Cl.
*B60S 1/54*    (2006.01)
(52) U.S. Cl. ........ 454/127; 454/121; 454/125; 454/126; 454/152; 454/155
(58) Field of Classification Search .......... 454/121–126, 454/127, 130, 143, 152, 69, 70–75
See application file for complete search history.

(56) References Cited

U.S. PATENT DOCUMENTS

| | | | | |
|---|---|---|---|---|
| 2,796,820 | A * | 6/1957 | Moore et al. | 454/127 |
| 3,608,469 | A * | 9/1971 | Mutoh et al. | 454/127 |
| 4,223,754 | A * | 9/1980 | Mizuno et al. | 180/90 |
| 4,266,722 | A * | 5/1981 | Nawa et al. | 239/590.5 |
| 4,903,581 | A * | 2/1990 | Nilsson | 454/124 |
| RE33,981 | E * | 6/1992 | Nilsson | 454/124 |
| 5,173,078 | A * | 12/1992 | Robin et al. | 454/126 |
| 5,518,449 | A * | 5/1996 | Danieau | 454/121 |
| 5,545,085 | A * | 8/1996 | Danieau | 454/124 |
| 6,089,971 | A * | 7/2000 | Jokela et al. | 454/127 |
| 6,257,975 | B1 * | 7/2001 | Giez | 454/127 |
| 6,378,934 | B1 * | 4/2002 | Palazzolo et al. | 296/208 |
| 6,431,257 | B1 * | 8/2002 | Sano et al. | 165/42 |
| 6,431,267 | B1 * | 8/2002 | Tanaka | 165/204 |

(Continued)

FOREIGN PATENT DOCUMENTS
EP    1288033    A2 *    3/2003
(Continued)

*Primary Examiner* — Steven B McAllister
*Assistant Examiner* — Jamil Decker
(74) *Attorney, Agent, or Firm* — Davidson, Berquist, Jackson & Gowdey, LLP

(57) ABSTRACT

An air conditioning system for a passenger compartment of a road vehicle; the air conditioning system has an elongated upper air inlet, which comes out through a top surface of a dashboard of the passenger compartment, close to a windscreen, extends substantially along the whole of the top surface of the dashboard, and is directed towards the passenger compartment to direct airflow tangent to the top surface of the dashboard and over the top surface.

17 Claims, 4 Drawing Sheets

U.S. PATENT DOCUMENTS

| | | | |
|---|---|---|---|
| 6,508,701 B1 * | 1/2003 | Foury et al. | 454/121 |
| 6,530,832 B2 * | 3/2003 | Elliot et al. | 454/127 |
| 6,601,902 B1 * | 8/2003 | Rahmstorf et al. | 296/70 |
| 6,709,327 B2 * | 3/2004 | Elliot et al. | 454/121 |
| 6,840,852 B2 * | 1/2005 | Gehring et al. | 454/153 |
| 6,843,716 B2 * | 1/2005 | Butera et al. | 454/121 |
| 6,902,474 B2 * | 6/2005 | Gehring et al. | 454/153 |
| 6,941,967 B2 * | 9/2005 | Butera et al. | 137/351 |
| 7,118,154 B2 * | 10/2006 | Yamazaki et al. | 296/70 |
| 7,195,555 B2 * | 3/2007 | Gehring et al. | 454/153 |
| 7,544,121 B2 * | 6/2009 | Jahn et al. | 454/127 |
| 7,815,498 B2 * | 10/2010 | Biasiotto et al. | 454/69 |
| 7,871,318 B2 * | 1/2011 | Williams | 454/155 |
| 2001/0021634 A1 * | 9/2001 | Elliot et al. | 454/121 |
| 2002/0160706 A1 * | 10/2002 | Elliot et al. | 454/121 |
| 2002/0164941 A1 * | 11/2002 | Elliot et al. | 454/121 |
| 2005/0239389 A1 * | 10/2005 | Jahn et al. | 454/127 |
| 2006/0172677 A1 * | 8/2006 | Ryu | 454/152 |
| 2006/0217054 A1 * | 9/2006 | Hoehn et al. | 454/127 |
| 2010/0178861 A1 * | 7/2010 | Sano | 454/127 |

FOREIGN PATENT DOCUMENTS

JP     03235741 A * 10/1991

* cited by examiner

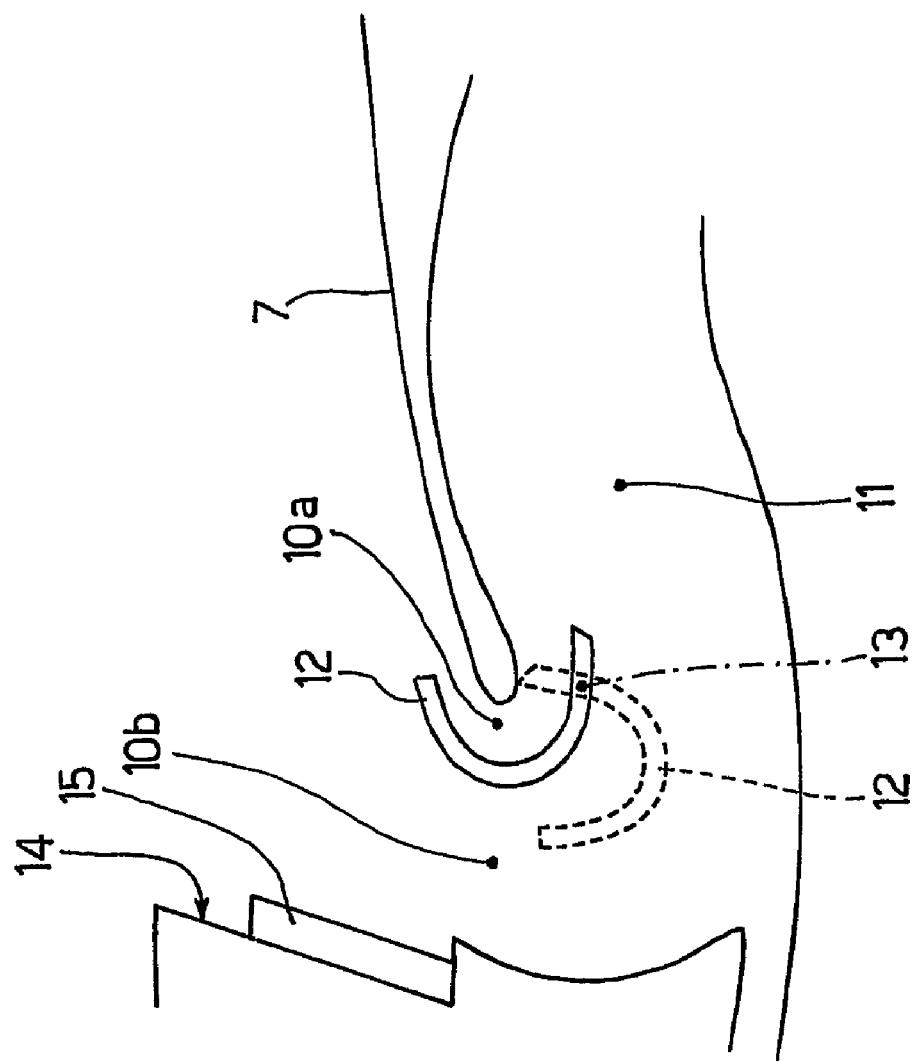

AIR CONDITIONING SYSTEM FOR THE PASSENGER COMPARTMENT OF A VEHICLE

TECHNICAL FIELD

The present invention relates to an air conditioning system for the passenger compartment of a road vehicle, in particular, a car.

BACKGROUND ART

A car is equipped with an air conditioning system for conditioning the passenger compartment by feeding in air treated (heated, cooled, dehumidified and/or filtered) to passenger requirements. For which purpose, the air conditioning system comprises an air processing unit for processing the air subsequently fed into the passenger compartment through a number of air outlets inside the compartment.

Air outlets are normally located at different levels inside the passenger compartment to direct air into different parts of the compartment, and, more specifically, normally comprise upper outlets for directing air onto the inner surface of the windscreen, intermediate outlets for directing air towards the front-seat occupants, and lower outlets for directing air towards the feet of the front-seat occupants.

FR2029876 discloses an air conditioning system (1) for a passenger compartment of a road vehicle; the air conditioning system has an elongated upper air outlet, which comes out through a top surface of a dashboard of the passenger compartment, close to a windscreen, extends substantially along the whole of the top surface of the dashboard, and is directed towards the passenger compartment to direct airflow tangent to the top surface of the dashboard and over the top surface.

DE3818666 discloses an air duct for a motor vehicle; the air duct is mounted on top of a dashboard for the purpose of improved installation, better access to the fittings underneath the dashboard and for greater diversity in design.

DISCLOSURE OF INVENTION

It is an object of the present invention to provide a road vehicle passenger compartment air conditioning system, which is cheap and easy to produce and, at the same time, provides for effective, efficient air conditioning of the passenger compartment.

According to the present invention, there is provided an air conditioning system for the passenger compartment of a road vehicle, as claimed in the accompanying Claims.

BRIEF DESCRIPTION OF THE DRAWINGS

A non-limiting embodiment of the present invention will be described by way of example with reference to the accompanying drawings, in which:

FIG. 4 shows a larger-scale detail of FIG. 3.

PREFERRED EMBODIMENTS OF THE INVENTION

Figure 1:
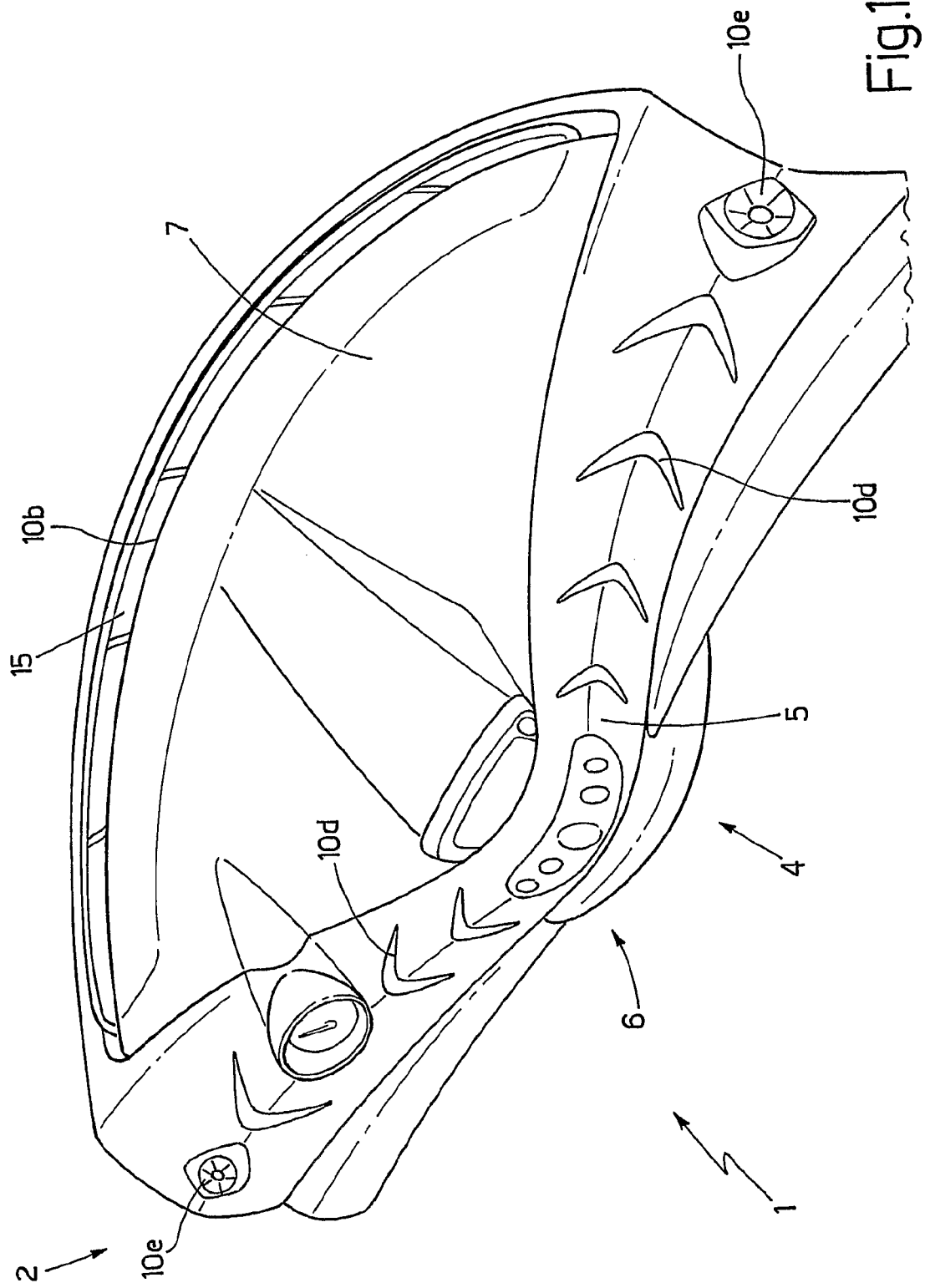
FIG. 1 shows a schematic view in perspective, with parts removed for clarity, of a passenger compartment of a car equipped with an air conditioning system in accordance with the present invention.

Number 1 in FIG. 1 indicates as a whole an air conditioning system of a car passenger compartment 2.

Passenger compartment 2 comprises a windscreen 3 and a dashboard 4, which in turn comprises a substantially vertical front surface 5 supporting instruments 6; a substantially horizontal top surface 7 bounded on one side by front surface 5 and on the opposite side by windscreen 3; and a substantially horizontal bottom surface 8.

Air conditioning system 1 comprises an air processing unit 9 (FIG. 2) for processing (heating, cooling, dehumidifying and/or filtering) the air to be fed into passenger compartment 2. Air processing unit 9 is connected to a number of air outlets 10 for directing the air processed by air processing unit 9 into passenger compartment 2, and which are arranged at different levels inside passenger compartment 2 to direct air into different parts of passenger compartment 2.

More specifically, air outlets 10 comprise upper air outlets 10 (FIGS. 1 and 2) in top surface 7 of dashboard 4; front air outlets 10 (FIG. 1) in front surface 5 of dashboard 4; and lower air outlets 10 (FIG. 2) in bottom surface 8 of dashboard 4.

Figure 2:
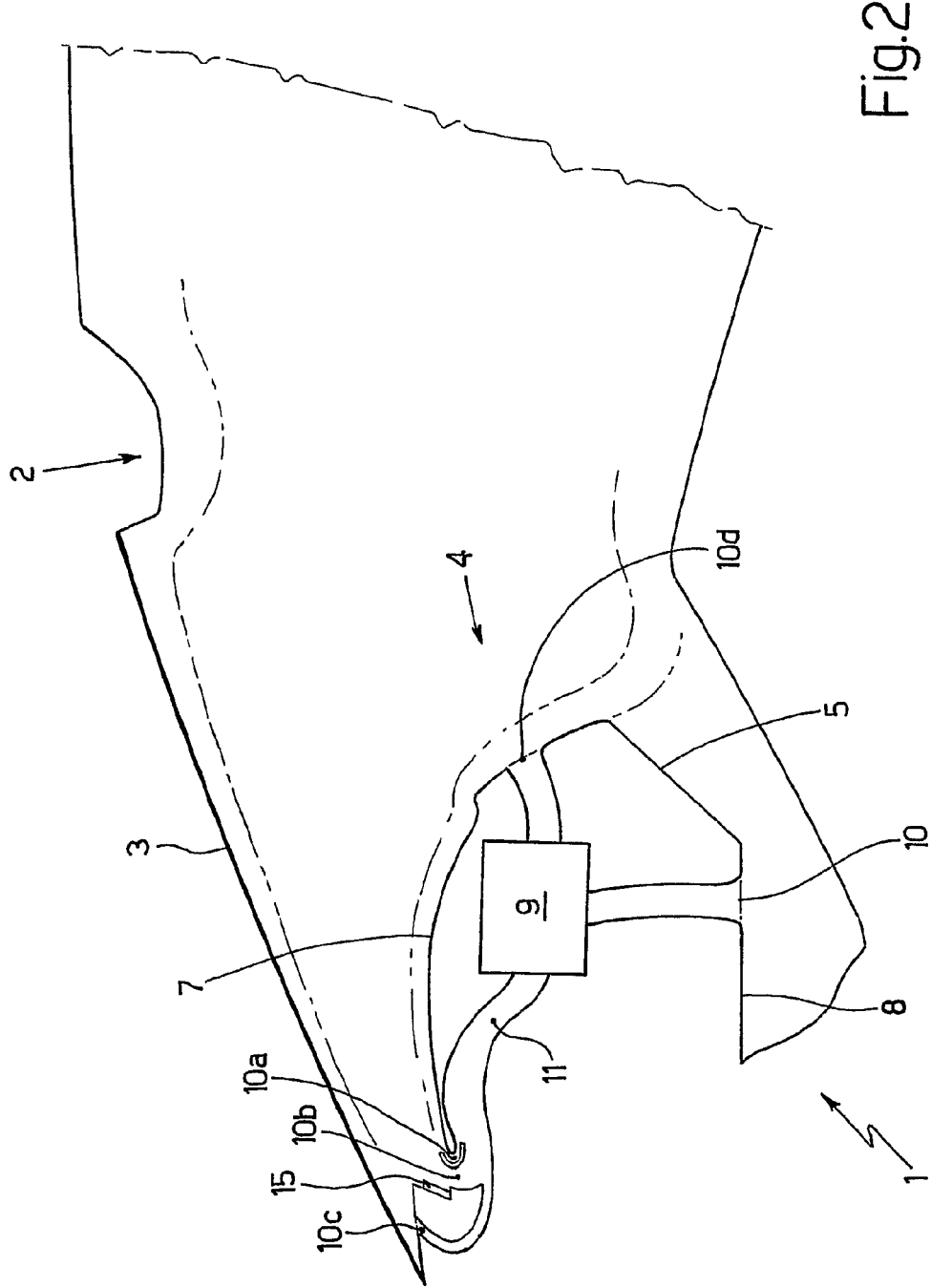
FIG. 2 shows a schematic lateral section, with parts removed for clarity, of the dashboard of the FIG. 1 passenger compartment.

As shown in FIG. 2, air conditioning system 1 comprises an elongated upper air outlet 10*a*, which comes out through top surface 7 of dashboard 4, close to windscreen 3, extends along substantially the whole of top surface 7 of dashboard 4, and is directed towards passenger compartment 2 to direct airflow tangentially to and over top surface 7 of dashboard 4.

Air conditioning system 1 comprises an elongated upper air outlet 10*b*, which comes out through top surface 7 of dashboard 4, close to windscreen 3, is located between windscreen 3 and upper air outlet 10*a*, extends along substantially the whole of top surface 7 of dashboard 4, is directed towards windscreen 3 to direct airflow over windscreen 3, and has a larger airflow section (roughly 2-6 times larger) than upper air outlet 10*a*.

Figure 3:
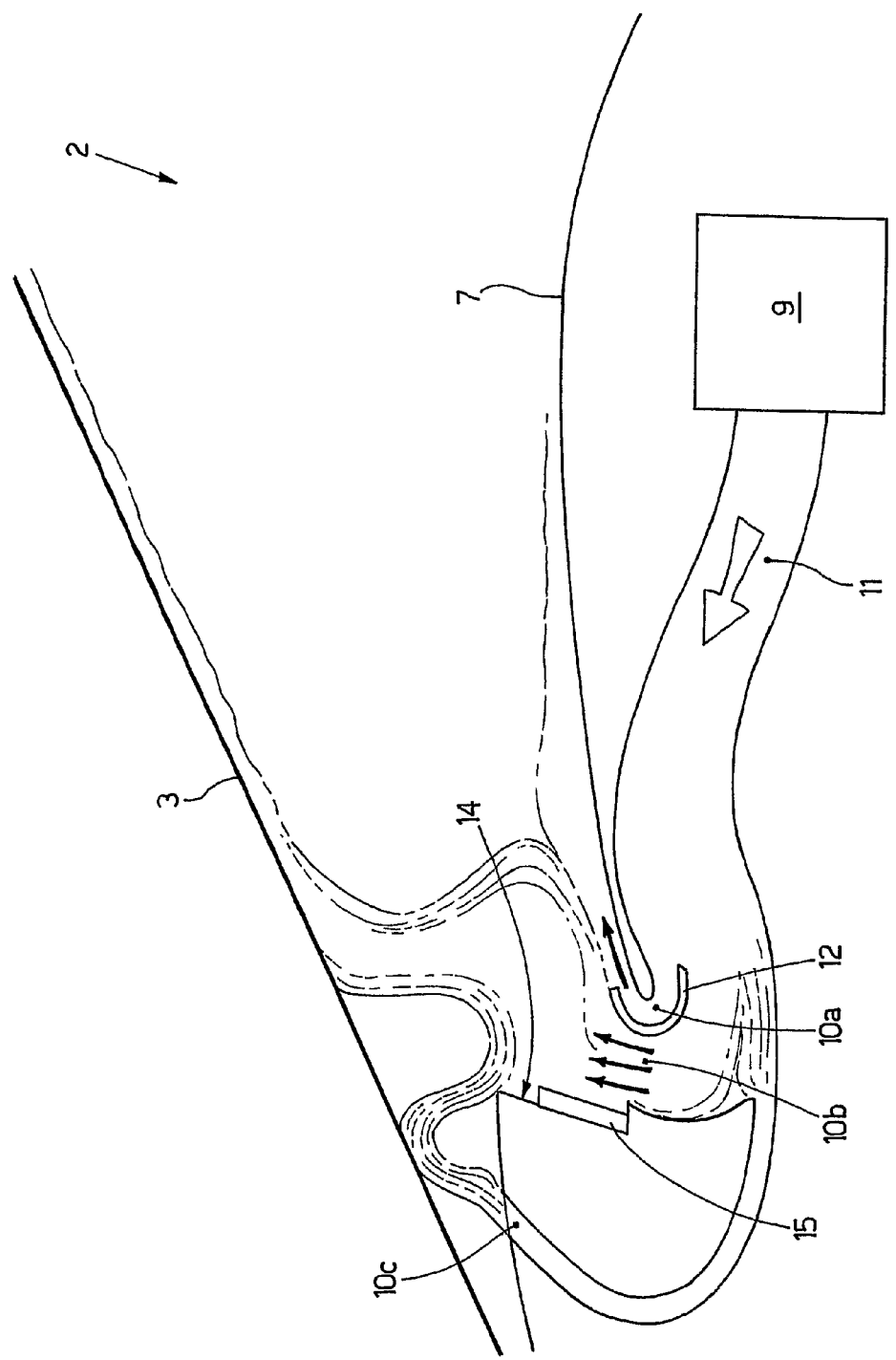
FIG. 3 shows a larger-scale detail of FIG. 2.

Upper air outlets 10*a* and 10*b* are connected to air processing unit 9 by a common feed line 11; and a baffle 12 is provided, which is movable between an open position (shown by the continuous line in FIGS. 3 and 4) allowing airflow through upper air outlet 10*a*, and a closed position (shown by the dash line in FIG. 4) cutting off airflow through upper air outlet 10*a*. Baffle 12 rotates between the open and closed positions about an axis of rotation 13 perpendicular to the FIG. 4 plane and parallel to top surface 7 of dashboard 4.

Air supply from upper air outlet 10*a* can be cut off by baffle 12 to direct all the available air onto windscreen 3 in defrost mode, i.e. for fast defrosting of windscreen 3.

In a preferred embodiment, baffle 12 is U-shaped, with two flat portions connected by a curved portion, and, in the open position, is positioned with a first flat portion inside and parallel to common feed line 11, and a second flat portion outside common feed line 11 and parallel to top surface 7 of dashboard 4.

Air conditioning system 1 comprises an elongated upper air outlet 10*c*, which comes out through top surface 7 of dashboard 4, close to windscreen 3, is located between windscreen 3 and upper air outlet 10*b*, extends along substantially the whole of top surface 7 of dashboard 4, and is directed towards windscreen 3 to direct airflow over windscreen 3. Upper air outlet 10*b* has a larger airflow section (roughly 2-6 times larger) than upper air outlet 10*c*; and the airflow directed onto windscreen 3 by upper air outlet 10*c* is more tangent to windscreen 3 than that of upper air outlet 10*b*.

Upper air outlet 10*c* is also connected to air processing unit 9 by common feed line 11, which caters to all three upper air outlets 10.

In a preferred embodiment, the mouth of upper air outlet 10*c* is located higher than the mouth of upper air outlet 10*b*, so as to be closer than the mouth of upper air outlet 10*b* to windscreen 3. In one possible embodiment, the mouth of upper air outlet 10b is defined on one side by a substantially vertical wall 14 supporting a flat, elongated, e.g. liquid-crystal, screen 15; and, for easy reading of flat screen 15, vertical wall 14 is tilted slightly towards dashboard 4.

As shown in FIG. 1, air conditioning system 1 comprises a number of front air outlets 10d, each of which comes out through front surface 5 of dashboard 4, close to top surface 7, and is directed, parallel to front surface 5, towards a lateral end of the car to direct airflow over front surface 5.

Dashboard 4 preferably has two opposite lateral ends next to the front doors of the car, and each front air outlet 10d is oriented towards the lateral end of dashboard 4 closest to it, so that, on one half of dashboard 4, front air outlets 10d are all oriented the same way, and in the opposite direction to the front air outlets 10d on the other half of dashboard 4.

At each front air outlet 10d, front surface 5 of dashboard 4 has a recess (arrow-shaped in the embodiment shown) bounded on one side by a wall substantially perpendicular to front surface 5 and through which the mouth of front air outlet 10d is formed.

Finally, air conditioning system 1 comprises at least two front air outlets 10e, each of which emits a concentrated airflow and is adjustable manually for two-dimensional adjustment of the airflow direction.

Upper air outlet 10a provides for continuously blowing air over top surface 7 of dashboard 4. This is particularly useful for cooling passenger compartment 2 when the car is in the sun, by cooling top surface 7 of dashboard 4 to reduce or eliminate the heating effect of the sun. In other words, when the car is in the sun, top surface 7 of dashboard 4 is directly exposed to and heated considerably by the sun, to the discomfort of front-seat passengers, which is reduced or eliminated by continuously blowing air over and cooling top surface 7 of dashboard 4 as described above. Obviously, this function is only performed by the airflow from upper air outlet 10a when cooling passenger compartment 2.

By the time it flows over the whole of top surface 7 of dashboard 4, the airflow from upper air outlet 10a loses speed, thus eliminating discomfort to the front-seat occupants. Obviously, this function of the airflow from upper air outlet 10a is performed when both cooling and heating passenger compartment 2.

Front air outlets 10d provide for feeding large amounts of air into passenger compartment 2 with no discomfort to the front-seat occupants, by directing airflow parallel to front surface 5 of dashboard 4 and towards a lateral end of the car, as opposed to directly towards the front-seat occupants. Obviously, direct airflow to a front-seat occupant, if desired, can be achieved at any time using respective front air outlets 10e.

The invention claimed is:

1. A passenger compartment (2) of a road vehicle and comprising:
   a windscreen (3);
   a dashboard (4), in turn comprising a substantially vertical front surface (5) supporting instruments (6), and a substantially horizontal top surface (7) bounded on one side by the front surface (5) and on the opposite side by the windscreen (3); and
   an air conditioning system (1) comprising: a number of air outlets (10) inside the passenger compartment (2); an air processing unit (9) connected to the air outlets (10) to process the air subsequently fed into the passenger compartment (2) through the air outlets (10);
   a first upper air outlet (10a), which comes out through the top surface (7) of the dashboard (4), close to the windscreen (3), extends substantially along the whole of the top surface (7) of the dashboard (4), and is directed towards the passenger compartment (2) to direct airflow tangent to the top surface (7) of the dashboard (4) and over the top surface (7);
   a second upper air outlet (10b), which comes out through the top surface (7) of the dashboard (4), close to the windscreen (3), is located between the windscreen (3) and the first upper air outlet (10a), extends substantially along the whole of the top surface (7) of the dashboard (4), and is directed towards the windscreen (3) to direct airflow over the windscreen (3); and
   a third upper air outlet (10c), which comes out through the top surface (7) of the dashboard (4), close to the windscreen (3), is located between the windscreen (3) and the second upper air outlet (10b), extends substantially along the whole of the top surface (7) of the dashboard (4), and is directed towards the windscreen (3) to direct airflow over the windscreen (3);
   the second upper air outlet having a larger airflow section than the first upper air outlet and a larger airflow section than the third upper air outlet
   the first, second and third upper air outlets being connected to the air processing unit by a common feed line,
   a movable baffle movable between an open position allowing airflow through the first upper air outlet, and a closed position preventing airflow through the first upper air outlet; and
   wherein the movable baffle is U-shaped, and comprises two flat portions connected by a curved portion; in the open position, the movable baffle being positioned with a first flat portion inside the common feed line and parallel to the common feed line, and with a second flat portion outside the common feed line and parallel to the top surface of the dashboard.

2. A passenger compartment (2) as claimed in claim 1, wherein the movement of the movable baffle does not modify the airflow through the third upper air outlet.

3. A passenger compartment (2) as claimed in claim 1, wherein the baffle (12) rotates between the open position and the closed position.

4. A passenger compartment (2) as claimed in claim 1, wherein the third upper air outlet (10c) directs airflow onto the windscreen (3) in a direction more tangent to the windscreen (3) than that of the airflow directed onto the windscreen (3) by the second upper air outlet (10b).

5. A passenger compartment (2) as claimed in claim 1, wherein the mouth of the third upper air outlet (10c) is located higher than the mouth of the second upper air outlet (10b), so as to be closer than the mouth of the second upper air outlet (10b) to the windscreen (3).

6. A passenger compartment as claimed in claim 5, wherein the mouth of the second upper air outlet is bounded on one side by a substantially vertical wall supporting an elongated liquid crystal screen.

7. A passenger compartment (2) as claimed in claim 6, wherein the vertical wall (14) is tilted slightly towards the dashboard (4).

8. A passenger compartment (2) as claimed in claim 1, wherein the air conditioning system (1) comprises a number of first front air outlets (10d), each of which comes out through the front surface (5) of the dashboard (4), and is directed parallel to the front surface (5) and towards a lateral end of the vehicle to direct airflow over the front surface (5).

9. A passenger compartment (2) as claimed in claim 8, wherein the dashboard (4) has two opposite lateral ends located next to front doors of the vehicle; each first front air outlet (10*d*) being oriented towards the lateral end of the dashboard (4) closest to the first front air outlet (10*d*).

10. A passenger compartment (2) as claimed in claim 8, wherein the air conditioning system (1) comprises at least two second front air outlets (10*e*), each of which emits a concentrated airflow and is adjustable manually to permit two-dimensional adjustment of the airflow direction.

11. A passenger compartment (2) as claimed in claim 8, wherein, at each first front air outlet (10*d*), the front surface (5) of the dashboard (4) has a recess defined on one side by a wall substantially perpendicular to the front surface (5) and through which the mouth of the first front air outlet (10*d*) is formed.

12. A passenger compartment of a road vehicle and comprising: a windscreen;
- a dashboard, in turn comprising a substantially vertical front surface supporting instruments, and a substantially horizontal top surface bounded on one side by the front surface and on the opposite side by the windscreen; and
- an air conditioning system comprising: a number of air outlets inside the passenger compartment; an air processing unit connected to the air outlets to process the air subsequently fed into the passenger compartment through the air outlets;
- a first upper air outlet, which comes out through the top surface of the dashboard, close to the windscreen, extends substantially along the whole of the top surface of the dashboard, and is directed towards the passenger compartment to direct airflow tangent to the top surface of the dashboard and over the top surface;
- a second upper air outlet, which comes out through the top surface of the dashboard, close to the windscreen, is located between the windscreen and the first upper air outlet, extends substantially along the whole of the top surface of the dashboard, and is directed towards the windscreen to direct airflow over the windscreen;
- a third upper air outlet, which comes out through the top surface of the dashboard, close to the windscreen, is located between the windscreen and the second upper air outlet, extends substantially along the whole of the top surface of the dashboard, and is directed towards the windscreen to direct airflow over the windscreen; and
- wherein the second upper air outlet has a larger airflow section than the first upper air outlet and has a larger airflow section than the third upper air outlet;
- the mouth of the third upper air outlet being located higher than the mouth of the second upper air outlet, so as to be closer than the mouth of the second upper air outlet to the windscreen; and the mouth of the second upper air outlet is bounded on one side by a substantially vertical wall supporting an elongated liquid crystal screen.

13. A passenger compartment as claimed in claim 12, wherein the vertical wall is tilted slightly towards the dashboard.

14. A passenger compartment as claimed in claim 12, wherein the air conditioning system has a number of first front air outlets, each of which comes out through the front surface of the dashboard and is directed parallel to the front surface and towards a lateral end of the vehicle to direct airflow over the front surface.

15. A passenger compartment as claimed in claim 14, wherein the dashboard has two opposite lateral ends located next to front doors of the vehicle; each first front air outlet being oriented towards the lateral end of the dashboard closest to the first front air outlet.

16. A passenger compartment as claimed in claim 14, wherein the air conditioning system comprises at least two second front air outlets, each of which emits a concentrated airflow and is adjustable manually to permit two-dimensional adjustment of the airflow direction.

17. A passenger compartment as claimed in claim 14, wherein, at each first front air outlet, the front surface of the dashboard has a recess defined on one side by a wall substantially perpendicular to the front surface and through which the mouth of the first front air outlet is formed.

* * * * *